No. 621,461. Patented Mar. 21, 1899.
D. PARTINGTON.
BICYCLE BELL.
(Application filed Feb. 19, 1898.)
(No Model.)
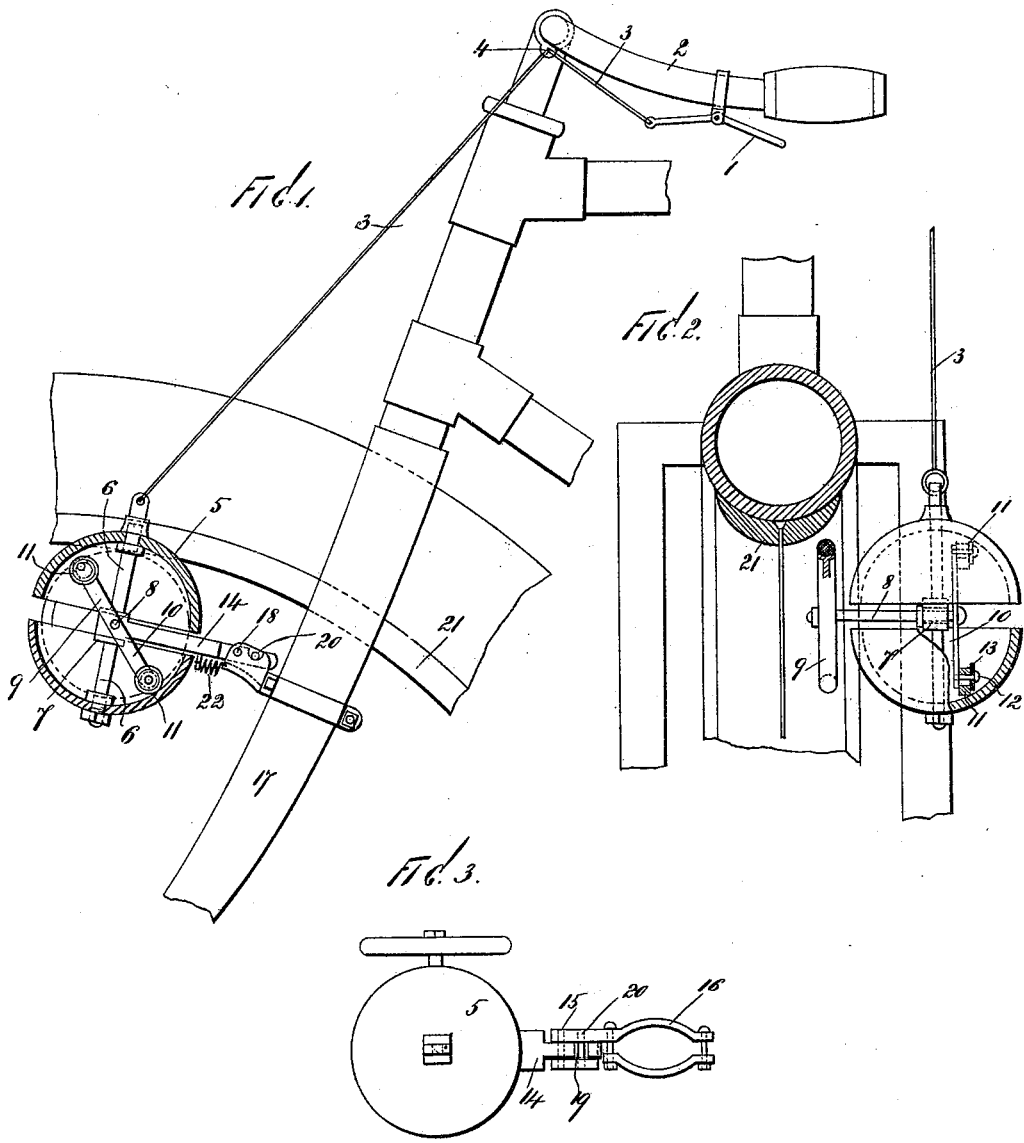
WITNESSES
John Buckler,
J. M. Fosler
INVENTOR
David Partington,
BY
Edgar Tate & Co.
ATTORNEYS

UNITED STATES PATENT OFFICE.

DAVID PARTINGTON, OF ATHERTON, ENGLAND.

BICYCLE-BELL.

SPECIFICATION forming part of Letters Patent No. 621,461, dated March 21, 1899.

Application filed February 19, 1898. Serial No. 670,966. (No model.)

*To all whom it may concern:*

Be it known that I, DAVID PARTINGTON, a subject of the Queen of Great Britain, residing at Atherton, in the county of Lancaster, England, have invented certain new and useful Improvements in Bicycle-Bells, of which the following is a full and complete specification, such as will enable those skilled in the art to which it appertains to make and use the same.

The object of this invention is to provide an improved bicycle alarm-bell and means for operating the same, the object being to provide means for quickly and conveniently sounding a bell that is under ready control by the rider.

The invention consists in the features of construction and combination of parts hereinafter fully described and specifically claimed.

The invention is fully disclosed in the following specification, of which the accompanying drawings form a part, in which the separate parts of my improvement are designated by the same numerals of reference in each of the views, and in which—

Figure 1 is a side elevation of a portion of a bicycle provided with this improvement. Fig. 2 is a front elevation, and Fig. 3 is a top plan of the bell and its support in detail.

The invention is designed to furnish an alarm that can be sounded whenever necessary by the rider when the machine is in motion conveniently and without the necessity of removing the hand from the handle-bar, and for this purpose a lever 1 is pivoted upon one of the handle-bars 2. The free end of said lever is situated adjacent to the hand-grip, as shown, while its other end is fastened to a chain or cord 3, that passes over a guide 4 near the steering-post, and thence downwardly and to the bell 5.

The bell 5 consists of two gongs oppositely arranged upon the ends of the arms 6, connected with a bearing 7, through which passes a shaft 8, provided at its outer end with a wheel 9 and at its inner end with a cross-head 10, at the ends of which are revolubly mounted the hammers 11, said hammers consisting of rollers provided with central bores, through which are passed pivot-pins 12, connected with the cross-head 10. The central bores of the hammers 11 are much larger than the pivot-pins 12, on which they are mounted, and are free to move laterally on said pins, and the outer ends of said pivot-pins are provided with washers 13, which hold said hammers in place. The bearing 7 is also provided with a main arm 14, which is pivotally connected with the extension 15 of one side of a clamp 16, which is adapted to be connected with one side of the forward fork 17 of the machine.

The extension 15 of the clamp 16, with which the arm 14 is pivotally connected at 18, is provided with two upwardly-directed jaws, between which said arm is pivoted, and the end of said arm is provided with a transverse notch or recess 19, and said jaws are provided with a cross-pin 20, which enters said notch or recess.

The wheel 9 is operated by the rim 21 of the drive-wheel of the vehicle, and said wheel 9 is normally held out of contact with the rim 21 by a spring 22, secured at one end to the arm 14 and at the other to the extension 15 of the clamp 16, with which said arm is connected, and the object of the pin 20 is to limit the downward movement of the bell and to hold the same in proper position with relation to the rim of the wheel.

It is seen from the foregoing description that normally the wheel 9 is held away from the rim of the guide-wheel of the vehicle, but that when the lever 1 is operated the bell is raised until the wheel 9 is thrown in contact with said rim of the guide-wheel. The hammers rotate with the wheel 9 and also on their own pivot-pins and sound an alarm in an obvious manner as long as the pulley-wheel 9 is held against the wheel-rim 21.

My improved bicycle-bell is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A device of the character herein described, comprising a clamp which is adapted to be connected with the forward fork of a bicycle or similar vehicle, an arm pivotally connected therewith and adapted to swing vertically, said arm being provided at its outer end with a bearing, supplemental arms connected with said bearing and provided at their outer ends with a gong, a shaft passing through said bearing, a cross-head connected with the end thereof within said gongs, and provided at its ends with hammers, a wheel connected with the outer end of said shaft, and means for raising said arm so as to throw said wheel into contact with the rim of the guide-wheel of the vehicle, substantially as shown and described.

2. A device of the character herein described, comprising a clamp which is adapted to be connected with the forward fork of a bicycle or similar vehicle, an arm pivotally connected therewith and adapted to swing vertically, said arm being provided at its outer end with a bearing, supplemental arms connected with said bearing and provided at their outer ends with a gong, a shaft passing through said bearing, a cross-head connected with the end thereof within said gongs, and provided at its ends with hammers, a wheel connected on the outer end of said shaft, and means for raising said arm so as to throw said wheel into contact with the rim of the guide-wheel of the vehicle, consisting of a lever pivotally connected with one of the handle-bars, a cord connected therewith and with the support of one of said gongs, substantially as shown and described.

3. The herein-described alarm device for bicycles and similar vehicles, comprising a bell composed of two oppositely-supported gongs, an arm with which the supports of said gongs are connected, said arm being pivotally connected with a clamp which is adapted to be secured to the forward fork of the vehicle, means for limiting the movement of said arm, a shaft passing through the inner end of said arm, a cross-head connected with the inner end of said shaft within said bell, hammers connected with the opposite ends of said cross-head and a wheel connected with the outer end of said shaft, and means for raising said bell so as to throw said wheel into contact with the rim of the guide-wheel of the vehicle, substantially as shown and described.

4. The herein-described alarm device for bicycles and similar vehicles, comprising a bell composed of two oppositely-supported gongs, an arm with which the supports of said gongs are connected, said arm being pivotally connected with a clamp which is adapted to be secured to the forward fork of the vehicle, means for limiting the movement of said arm, a shaft passing through the inner end of said arm, a cross-head connected with the inner end of said shaft within said bell, hammers connected with the opposite ends of said cross-head and a wheel connected with the outer end of said shaft, and means for raising said bell so as to throw said wheel into contact with the rim of the guide-wheel of the vehicle, said hammers being laterally movable on their supports, substantially as shown and described.

In testimony that I claim the foregoing as my invention I have signed my name, in presence of the subscribing witnesses, this 3d day of February, 1898.

DAVID PARTINGTON.

Witnesses:
JOSHUA UNSWORTH,
JOSEPH RICHARD PORTER.